INVENTOR
HARRISON F. EDWARDS
ALFRED D. GRONNER
BY
ATTORNEY

United States Patent Office 3,358,509
Patented Dec. 19, 1967

3,358,509
HYDROSTATIC LIQUID QUANTITY GAUGE WITH ATTITUDE CORRECTION
Harrison F. Edwards, Pleasantville, and Alfred D. Gronner, White Plains N.Y., assignors to Simmonds Precision Products, Inc., Tarrytown, N.Y., a corporation of New York
Filed Apr. 5, 1965, Ser. No. 445,647
4 Claims. (Cl. 73—301)

ABSTRACT OF THE DISCLOSURE

A system for measuring the correct weight of fluid in a container regardless of the attitude of the container and utilizing a rebalancing bridge circuit having one arm connected to a differential pressure transducer and the other arm connected to plural potentiometers connected in parallel. Each of the potentiometers has an attitude responsive switch for connecting an appropriate potentiometer to the rebalancing portion of the bridge circuit in response to the particular attitude sensed for the container.

This invention relates to the measuring of weight of fluid in a container and, more particularly, to the measurement of the true weight of fluid regardless of the attitude assumed by the container.

It is the object of the present invention to provide an apparatus for measuring true fluid weight in a container.

It is another object of the present invention to provide an apparatus which measures the true weight of fluid in a container regardless of the attitude which the container may assume.

It is yet another object of the present invention to provide accurate weight measurements of fluid in a closed container while correcting with simple instrumentation for varying attitudes of the container.

According to one aspect of the present invention there is provided a fuel tank with a pressure transducer at its bottom-most portion. The transducer measures the weight of the fuel column $h$ above it regardless of attitude. It reads therefore $h\gamma$ ($\gamma$=specific weight). For each attitude (combination of pitch and roll in an airplane) a characterization curve can be computed obtaining fuel weights from $h\gamma$. These curves are different for different attitudes and mathematically the true solution is a function $$F = f[\alpha, \beta, (h\gamma)]$$

where F is the fuel weight, $\alpha$ is the roll, $\beta$ is the pitch, $h\gamma$ is the pressure gauge indication. The invention provides a number of potentiometers having a non-linear taper derived from the curve $F=[\alpha,\beta(h\gamma)]$ where $\alpha\beta$ are the midpoints of the attitude range over which a number of potentiometer switches close. One of the switches is closed depending on the attitude combination which exists and a potentiometer tapered for that attitude range will come into play. The pressure signal is then compared with the reference voltage in an appropriate bridge circuit. The resultant signal is fed to a motor connected to the potentiometer taps for rebalancing the bridge circuits. The dial indicator connected to the motor shaft then indicates the true fuel weight for a given attitude of the tank.

A better undertsanding of the invention will be had after reading the following detailed description with reference to the appended drawings, in which.

Figure 1:
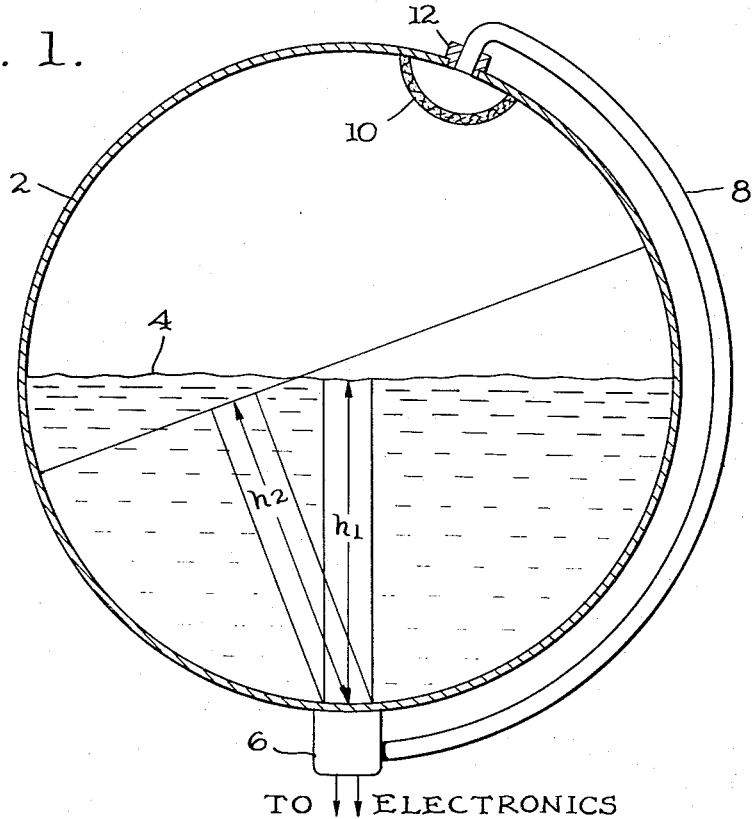
FIG. 1 is a schematic illustration of a fuel tank equipped with a differential pressure transducer.

Referring now to FIG. 1, there is shown a fuel tank 2 containing a quantity of fuel 4 and equipped with a differential pressure transducer 6 at the bottom thereof which may be of conventional design, for example, the diaphragm or bellows type operating a potentiometer through suitable gearing (not shown). Near the top of the tank there is secured by suitable bushing 12 a hollow tube 8 which is connected to the differential pressure transducer. Surrounding the entrance to the tube at the top of the tank there is a gas-permeable liquid-impermeable membrane or the like which allows the gas volume pressure in the tank to be transferred by the tube 8 to the differential pressure transducer 6. The transducer 6 will indicate the weight of the fuel column above it regardless of attitude. It reads therefore $$h_2\gamma$$

where $\gamma$ is the specific weight of the fuel.

For each attitude of the fuel tank a characterization curve can be computed obtaining fuel weight from $h\gamma$. These curves are different for different attitudes and mathematically the true solution is a function $$F = [\alpha\beta(h\gamma)]$$

where F equals the fuel weight, $\alpha$ equals the roll, and $\beta$ equals the pitch, $h\gamma$ equals the pressure gauge indication. Because $\alpha$ and $\beta$ can be measured, F could be computed in a computer network. In practice, however, F does not depend very strongly on $\alpha$ and $\beta$, and it is possible to have $n$ combinations of $\alpha$ and $\beta$ each combination covering a range. For example, if the range is $\pm 6°$ in pitch and $\pm 20°$ in roll, and we assume a range of $\pm 2°$ does not change the reading of F substantially, we get:

(1) $\alpha = 0 \pm 2$
    $\beta = 0 \pm 2$
(2) $\alpha = 0 \pm 2$
    $\beta = 4 \pm 2$
(3) $\alpha = 0 \pm 2$
    $\beta = -4 \pm 2$
(4) $\alpha = 4 \pm 2$
    $\beta = 0 \pm 2$ etc., giving a total of 33 combinations. With the accuracy obtained from the above relations, a simple instrumentation in accordance with the principles of the present invention can be provided for measuring F.

Figure 2:
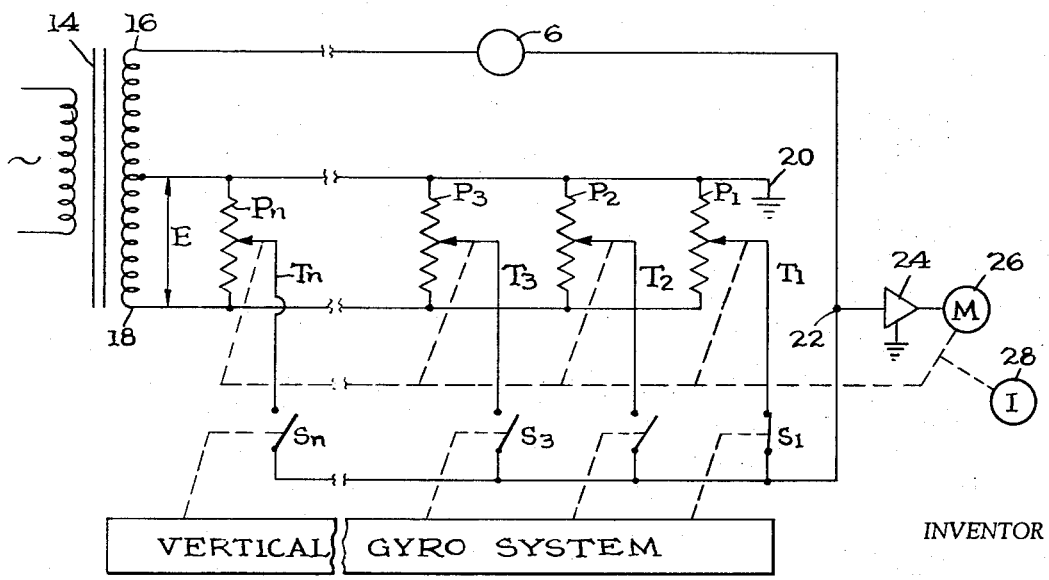
FIG. 2 is a schematic illustration of the bridge circuits utilized for attitude correction for the fuel weight measurement operation.

Referring now to FIG. 2, the differential pressure transducer is connected to the end terminal 16 of the secondary winding of the transformer 14 and as previously described the position of the bellows or diaphragm is determined by the differential pressure thereon and any mechanical movement is transmitted to position a potentiometer, the output of which is connected into the upper arm of the bridge circuit, as shown. The secondary winding is provided with a center tap 20 which is shown connected to ground. Between the other end 18 of the secondary and a junction point 22, there are provided $n$ number of potentiometers connected in parallel across the reference voltage E in the lower half of the secondary of transformer 14. Each potentiometer is non-linear and its taper is derived from the curve $F = [\alpha\beta(h\gamma)]$ where $\alpha$, $\beta$ are one of the $n$ combinations covering a particular attitude range over which switches $S_1$ through $S_n$ close. Each of the switches are controlled by a suitable vertical gyro system or other vertical reference system. For example, all modern aircraft have stable platforms controlled by gyros from which signals are available indicating the attitude in pitch and roll of the aircraft. These signals may be taken from a set of switches positioned in orthogonal axes which are opened and closed by the platform. Each of the switches $S_1$ through $S_n$ in FIG. 2 actually represents two such switches connected in series, one for pitch and one for roll. Depending on the attitude combination existing in the aircraft, one of the switches 1 to $n$ is closed and the potentiometer tapered for that particular attitude range will come into play. As shown in FIG. 2, if we consider switch $S_1$ closed in response to a given attitude as chosen by the vertical gyro system, then potentiometer $P_1$ tapered for that particular attitude is connected by the tap $T_1$ to the junction point 22. The differential pressure transducer is also connected to the junction 22. A phase detector amplifier 24 has its input connected to the output of the bridge circuit between junction 22 and ground. The output of the detector amplifier 24 is coupled to a conventional two-phase rebalancing motor 26 which is mechanically coupled both to an indicator 28 and to the tap $T_1$ of the potentiometer $P_1$. In the circuit just described if there is any change in the differential pressure transducer signal, a signal will be supplied to the motor 26 causing it to reposition the tap $T_1$ in a direction tending to reduce the signal to zero and rebalance the bridge. At this point the dial indicator 28 will indicate the weight of fuel in the tank for the attitude reflected by the tapered potentiometer $P_1$. At another attitude another switch S will close and a potentiometer P tapered for that particular attitude range will supply the reference signal at junction point 22. Each of the taps $T_1$ to $T_n$ is mechanically coupled to the motor so that any one tap may be repositioned in the event that its associated switch is closed.

The above system will give weight of fuel. It has to be divided by the acceleration to give mass of fuel. If this is desired, the reference voltage E must be made proportional to acceleration.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. In an apparatus for measuring the weight of fluid in a container having a differential pressure transducer therein, a bridge circuit having one arm connected to said pressure transducer and the other arm connected to a plurality of rebalancing potentiometers connected in parallel, means coupling said bridge circuit to an alternating voltage supply, means connecting said rebalancing potentiometers to an output point of said bridge circuit, phase detecting means connected to said output point, means responsive to said phase detecting means for adjusting said potentiometers in a direction to rebalance said bridge circuit, and means responsive to the adjustment of said potentiometers for indicating the weight of fluid in said container, each of said potentiometers having characteristics such that its mechanical output is related to its electrical output through at least the major portion of its entire range of operation by the relation $[\alpha\beta(h\gamma)]$, where $\alpha$ represents the roll of said container, $\beta$ represents the pitch of said container and $h\gamma$ represents the weight of fluid in said container.

2. In a device according to claim 1 wherein each of said potentiometers is respectively connected to a corresponding switch means.

3. In a device according to claim 2, wherein said switch means are sequentially actuated by a reference gyro system.

4. In an apparatus for measuring the weight of fluid in a container, a differential pressure transducer at the bottom of said container, a bridge circuit having one arm connected to said transducer and the other arm connected to a plurality of rebalancing potentiometers connected in parallel, means coupling said bridge circuit to an alternating voltage supply, means connecting said potentiometers to an output point of said bridge circuit, phase detecting means connected to said output point, means responsive to said phase detecting means for adjusting said potentiometers in a direction to rebalance said bridge circuit, selecting means for individually energizing said potentiometers and means responsive to the adjustment of said individually energized potentiometers for indicating the weight of fluid in said container, each of said potentiometers having characteristics such that its mechanical output is related to its electrical output according to a precalculated combination value of pitch and roll of said container.

References Cited
UNITED STATES PATENTS 2,910,868    11/1959    Fisher _____ 73—301
3,092,916    6/1963    Kendziorek et al. _____ 73—301

LOUIS R. PRINCE, *Primary Examiner.*

S. C. SWISHER, *Assistant Examiner.*